(12) United States Patent
Steinbuchel

(10) Patent No.: US 7,918,466 B2
(45) Date of Patent: Apr. 5, 2011

(54) VERTICAL AIR BAG CONTROL

(75) Inventor: Herman J. Steinbuchel, Upland, CA (US)

(73) Assignee: Barksdale, Inc., Los Angeles, CA (US)

(*) Notice: Subject to any disclaimer, the term of this patent is extended or adjusted under 35 U.S.C. 154(b) by 309 days.

(21) Appl. No.: 12/214,448

(22) Filed: Jun. 19, 2008

(65) Prior Publication Data

US 2008/0315539 A1    Dec. 25, 2008

Related U.S. Application Data

(60) Provisional application No. 60/936,543, filed on Jun. 21, 2007.

(51) Int. Cl.
*B60G 17/00* (2006.01)

(52) U.S. Cl. ............ 280/6.157; 280/5.514; 280/124.16; 188/322.13

(58) Field of Classification Search ............... 280/6.157, 280/5.514, 6.15, 124.16; 267/64.18; 188/319.1, 188/322.13, 266.1, 266.5
See application file for complete search history.

(56) References Cited

U.S. PATENT DOCUMENTS

| | | | |
|---|---|---|---|
| 2,959,426 A | | 11/1960 | Augustin |
| 3,477,739 A | * | 11/1969 | White .......................... 280/5.514 |
| 3,720,425 A | * | 3/1973 | Asano et al. ................ 267/64.16 |
| 4,634,142 A | * | 1/1987 | Woods et al. ............... 280/5.503 |
| 4,647,069 A | * | 3/1987 | Iijima ......................... 280/5.514 |
| 5,316,272 A | * | 5/1994 | Davis .......................... 267/64.13 |
| RE34,628 E | * | 6/1994 | Fujishiro et al. ........... 250/5.519 |
| 5,521,821 A | * | 5/1996 | Shimizu et al. .................. 701/37 |
| 5,988,607 A | * | 11/1999 | Beck ............................ 267/64.26 |
| 6,217,010 B1 | * | 4/2001 | McNeely .................... 267/64.16 |
| 6,553,761 B2 | * | 4/2003 | Beck ................................ 60/477 |
| 6,824,143 B2 | * | 11/2004 | Choi ............................ 280/5.514 |
| 2003/0067124 A1 | * | 4/2003 | Kang .......................... 280/5.514 |
| 2003/0085535 A1 | | 5/2003 | Choi |

FOREIGN PATENT DOCUMENTS

EP    1 426 649 A2    9/2004
WO    WO 01/14156 A1    1/2001

* cited by examiner

*Primary Examiner* — Ruth Ilan
*Assistant Examiner* — Timothy D Wilhelm
(74) *Attorney, Agent, or Firm* — Leon D. Rosen

(57) ABSTRACT

A control (60) that mounts in a space (52) between main vehicle parts (66, 68) that are supported one on the other by air bags (16). The control includes first and second vertical tubes (82, 106) that telescope in one another. The tubes enclose at least parts of valves (98, 111) and passages (84, 104, 101, 103) that connect the valves to inlet, exhaust and air bag ports (74, 76, 80).

5 Claims, 8 Drawing Sheets

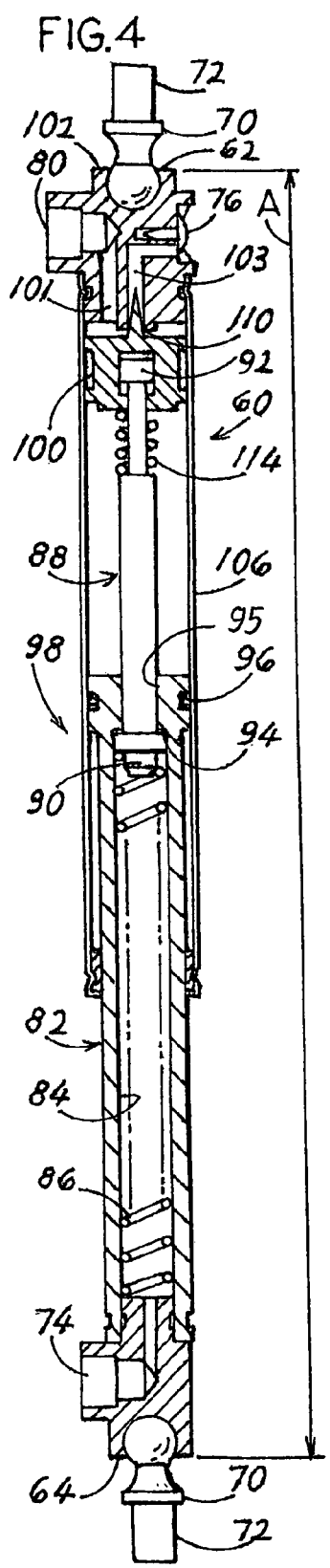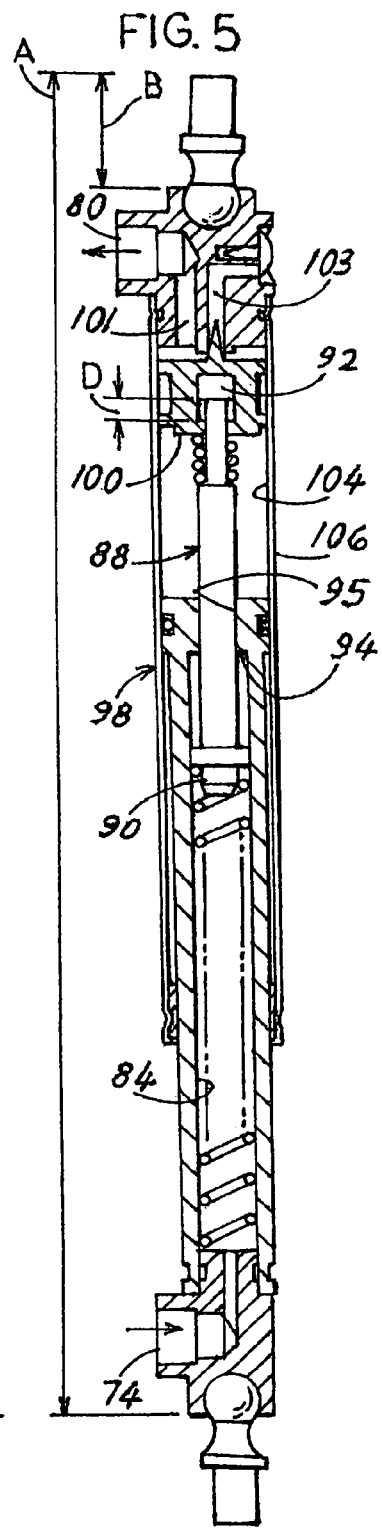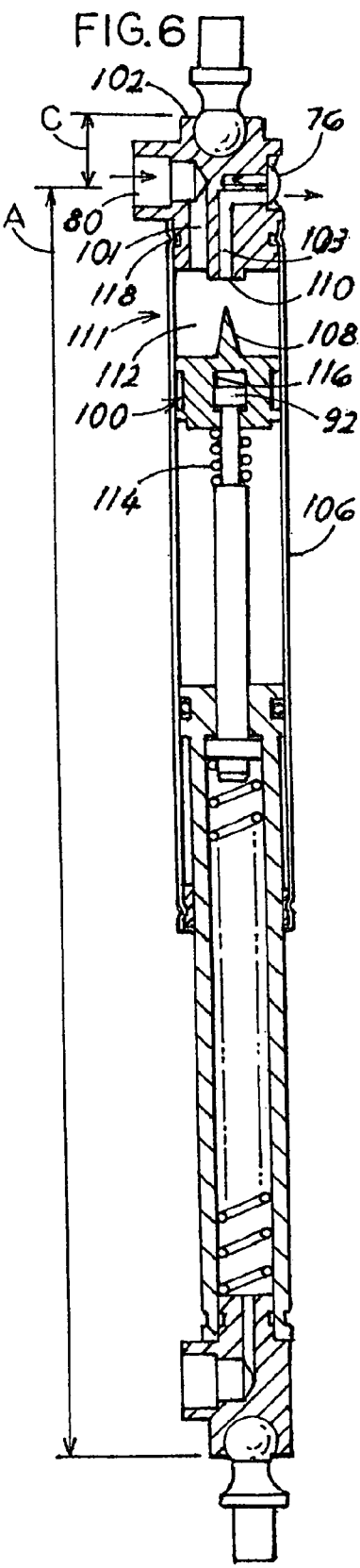

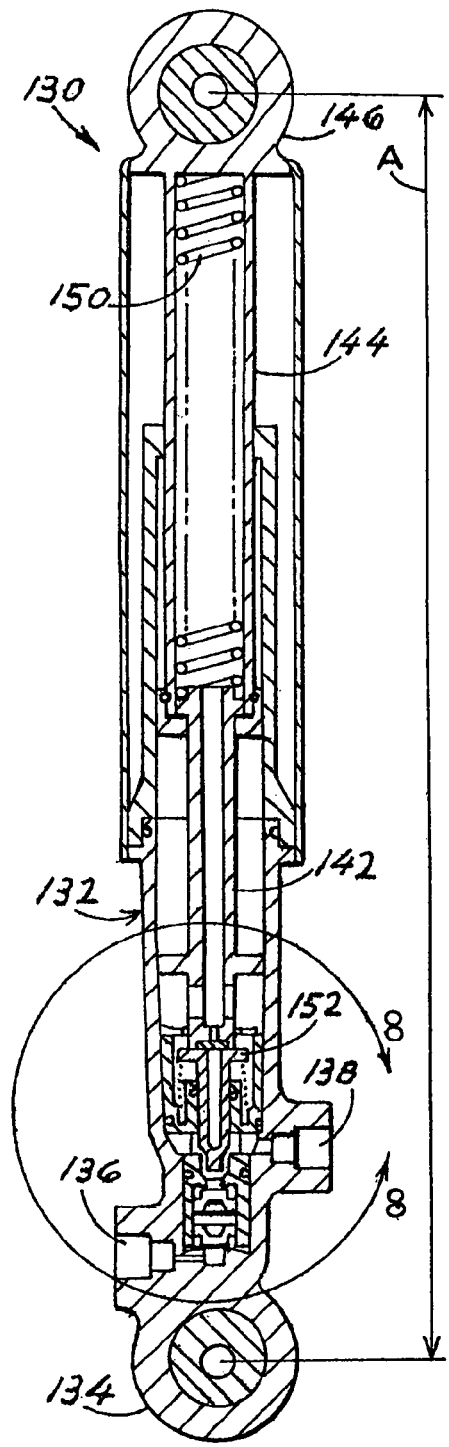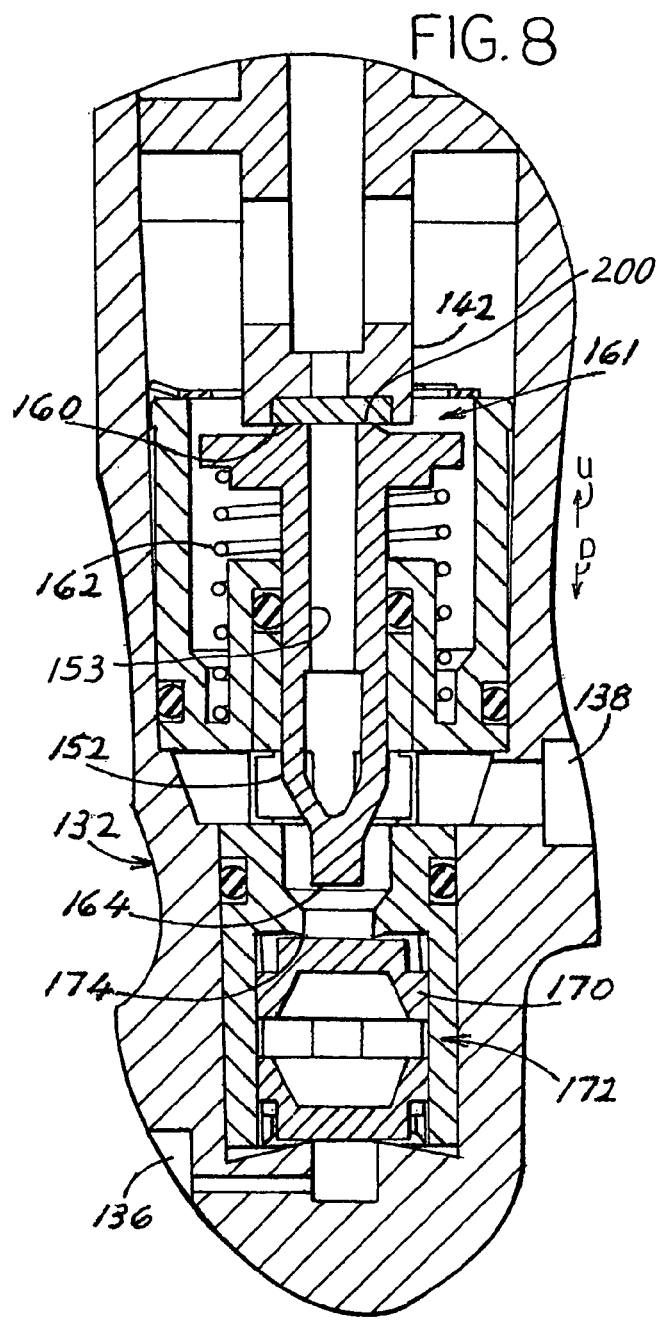

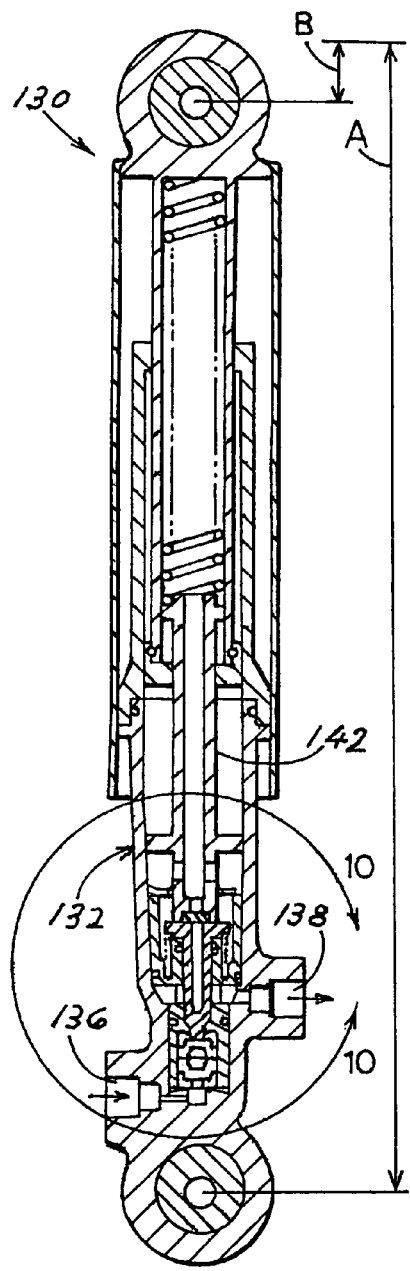
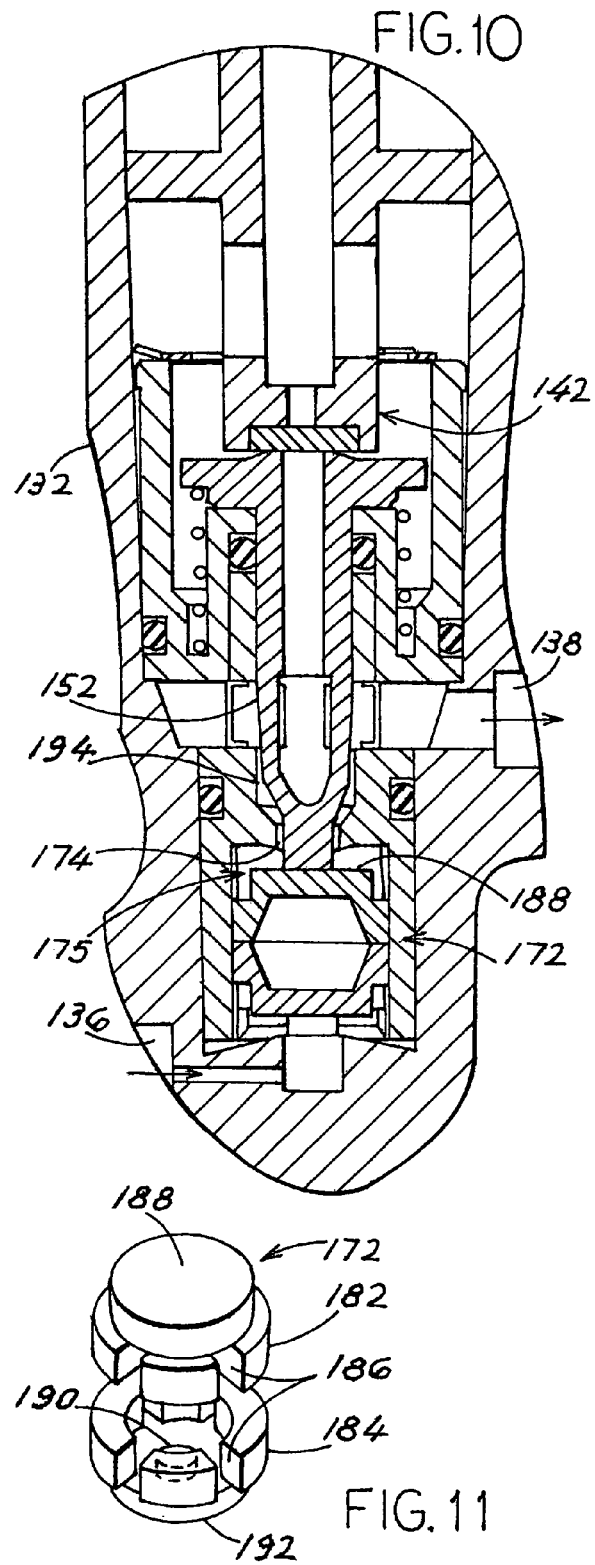
FIG. 9
FIG. 10
FIG. 11

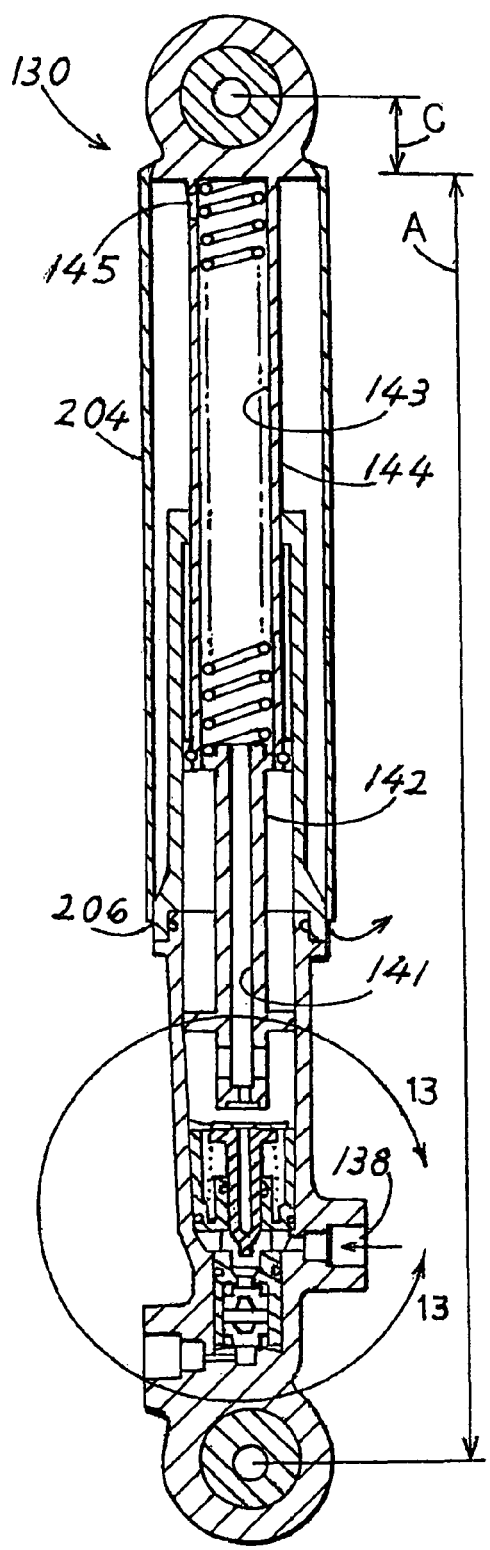
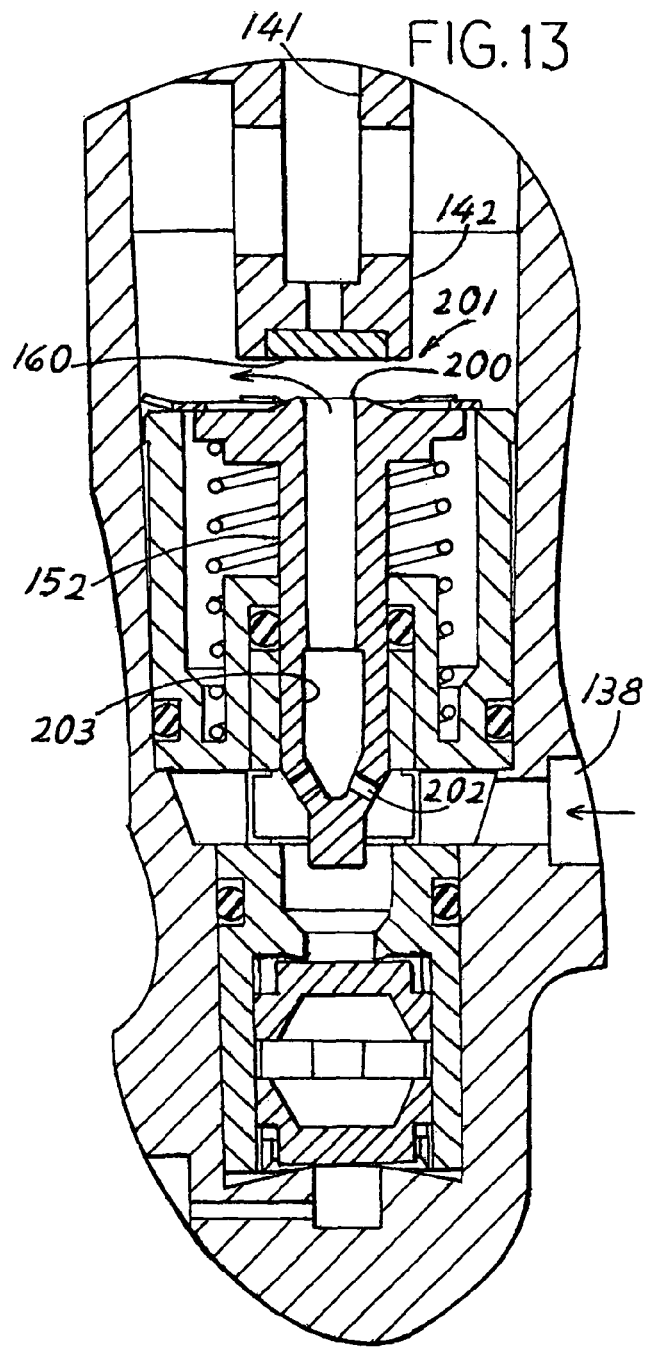
FIG.12
FIG.13

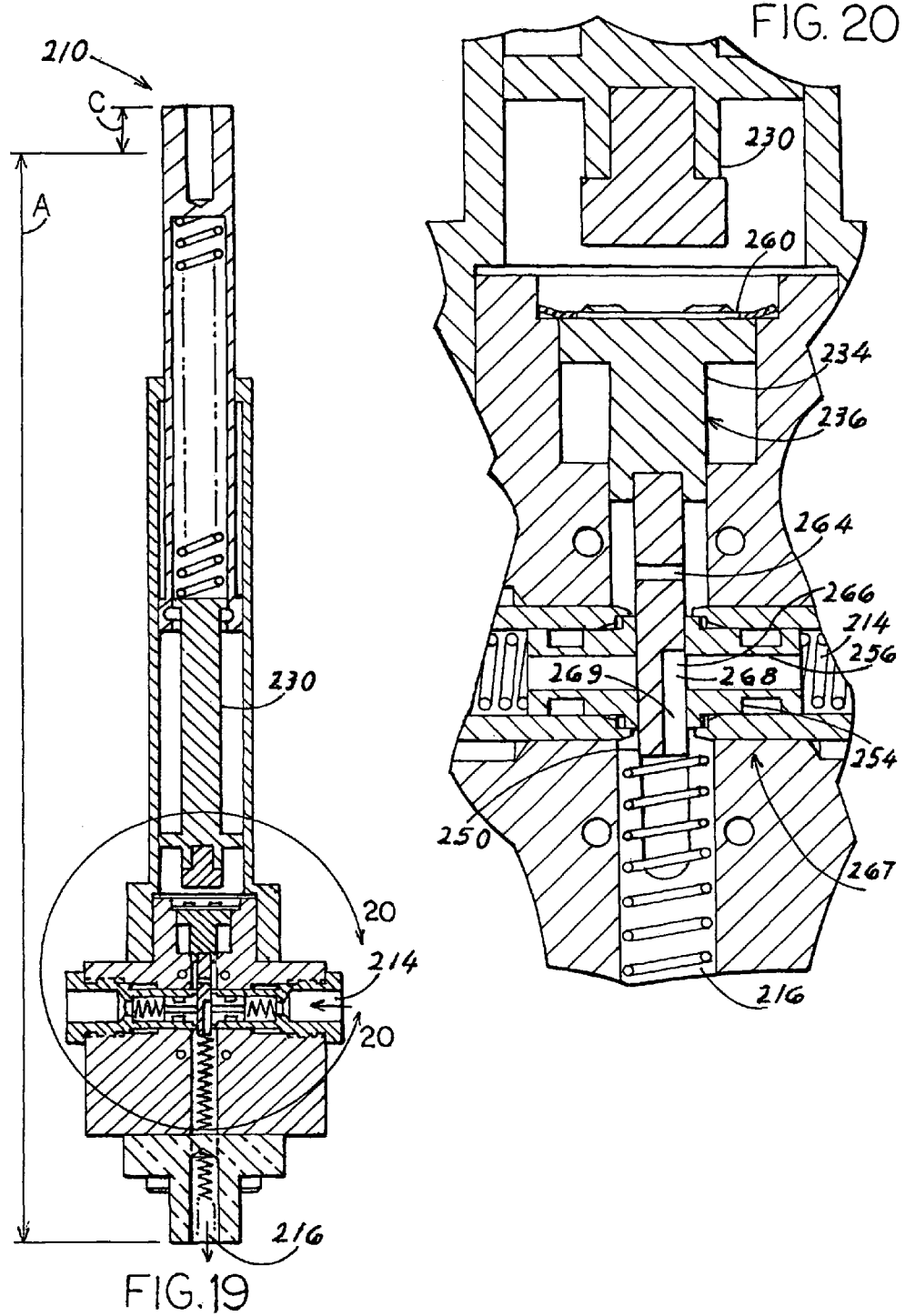

US 7,918,466 B2

VERTICAL AIR BAG CONTROL

CROSS-REFERENCE

Applicant claims priority from U.S. Provisional patent application Ser. No. 60/936,543 filed Jun. 21, 2007.

BACKGROUND OF THE INVENTION

Large land vehicles such as large trucks, commonly use air bags instead of springs to support an upper vehicle main part such as the vehicle chassis on a lower main part such as an axle, or to support a cab on the chassis. Like springs, the air bags absorb small vertical movements of the axles as the vehicle moves. For a proper ride, it is important that the air bag height be maintained close to the manufacturer's preferred height. At the selected height, the air bag pressure will also be optimum. An air bag requires a control to control the movement of pressured air at a pressure such as 120 psi, including the flow of air into an air bag when it is too short, and the flow of air out of the air bag when it is too tall.

One type of common control includes a valve with a rotatable valve member that can be rotated to any one of three positions within a housing to control the flow of air into or out of the air bag, or to prevent any air flow. The housing of the rotatable valve is fixed to one main vehicle part such as the chassis, and the rotatable valve member is connected to a linkage that consists of two links that connect to an axle. The linkage has the disadvantage that space must be left around the links, and the links constitute narrow elongated parts that can catch on clothing, cables, hoses, and other parts during vehicle repairs. A pressured air control for controlling air flow to and from an air bag, that could fit into the space between vehicle parts such as a chassis and axle occupied by prior controls, and which occupied little space and avoided long narrow parts that projected into otherwise empty space, would be of value.

SUMMARY OF THE INVENTION

In accordance with one embodiment of the invention, a control is provided for controlling the flow of pressured air into and out of an air bag, which fits into a vertical space of a height such as 1.5 feet (46 centimeters) that is commonly left for air bags in large vehicles, and which has a small width and length without long narrow parts that would project into the vertical space. The control includes vertically elongated members such as tubes that can slide vertically one within the other. When the air bag height increases to above optimum height, the tubes telescope apart to open one air flow path which connects the air bag to an exhaust port. When the air bag height decreases below optimum, the tubes telescope together and open another flow path that connects the high pressure air inlet port to the air bag.

The novel features of the invention are set forth with particularity in the appended claims. The invention will be best understood from the following description when read in conjunction with the accompanying drawings.

BRIEF DESCRIPTION OF THE DRAWINGS

FIG. 4 is a sectional view of an air bag control of a first embodiment of the invention, with the height of the controlled bag being optimal.

FIG. 5 is a view similar to that of FIG. 4, but with the air bag height being below the optimum height.

FIG. 6 is a view similar to that of FIG. 4, but with the air bag height being higher that the optimum height.

FIG. 7 is a sectional view of an air bag control of a second embodiment of the invention with the height of the controlled air bag being optimum.

FIG. 8 is an enlarged view of area 8-8 of FIG. 7.

FIG. 9 is a sectional view of the control of FIG. 7 but with a reduced height.

FIG. 10 is an enlarged view of area 10-10 of FIG. 9.

FIG. 11 is an isometric view of a valve assembly of the control of FIG. 10.

FIG. 12 is a sectional view of the control of FIG. 7 but with an increased height.

FIG. 13 is an enlarged view of area 13-13 of FIG. 12.

FIG. 19 is a sectional view of the control of FIG. 14 but with an increased height.

FIG. 20 is an enlarged view of area 19-19 of FIG. 19.

DESCRIPTION OF THE PREFERRED EMBODIMENTS

Figure 1:
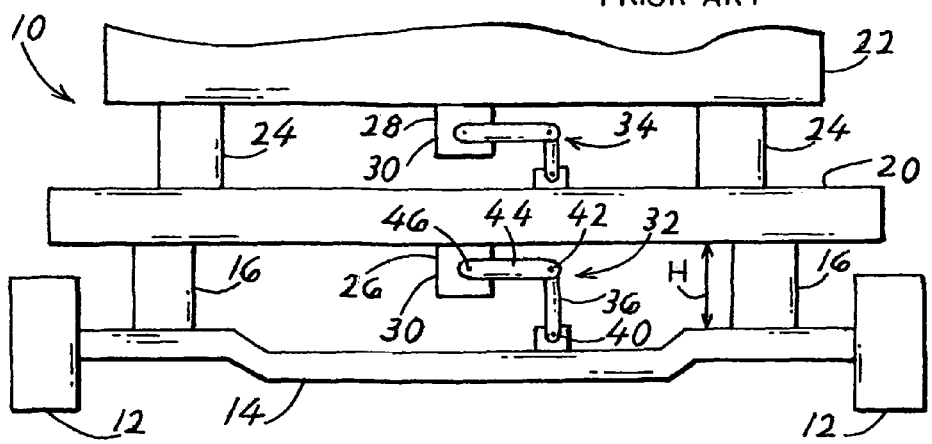
FIG. 1 is a sectional rear view of a portion of a large truck, showing air bag systems of the prior art.
Figure 2:
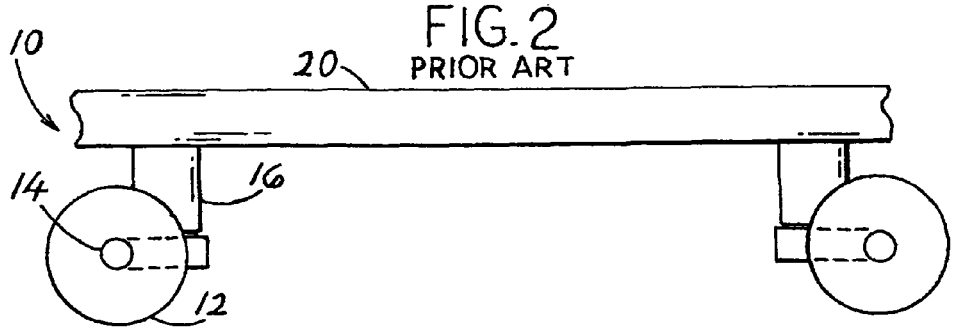
FIG. 2 is a partial side elevation view of the truck with air bag systems of the prior art of FIG. 1

FIGS. 1 and 2 shows portions of a large truck 10 which includes tires 12 that support axles 14 and air bags 16 that support the vehicle chassis 20 on the axles. FIG. 1 also shows the cab 22 of the vehicle which is supported by another set of air bags 24 on the chassis. The air bags must be maintained at close to the manufacturer's stated air bag height. Controls 26, 28 each includes a rotary valve 30 that controls the flow of air from a pressured air source at a pressure such as 120 psi (8 bars), to air bags at a pressure such as 40 psi (3 bars). Air flows into one or a pair of air bags such as 16 whenever the air bag height falls below the preferred height H (e.g. because of an increased load placed in the vehicle). The air bag control such as 26 also controls the exhaust of air from the air bags if their height increases above H (e.g. because of vehicle unloading or heating that expands the air). To sense the average height of a pair of air bags, the controls include linkages 32, 34 that couple two vehicle suspension parts such as the axle 14 and the chassis 20 that are separated by the air bags. Each linkage such as 32 has a link 36 with one end 40 pivotally connected to the chassis and another end 42 pivotally connected to a second link 44 that pivots about an axis 46 on the rotary valve 30. The rotary valve itself is mounted on the chassis. The control 28 for the cab is similar to that 26 for the chassis.

The valve and linkages have several disadvantages. Space must be left around the linkage element 36, 44 to assure no interference with pivoting of the linkage. The linkage and rod constitute narrow elongated parts that can catch on cables, hoses and other parts during vehicle repairs.

Figure 3:
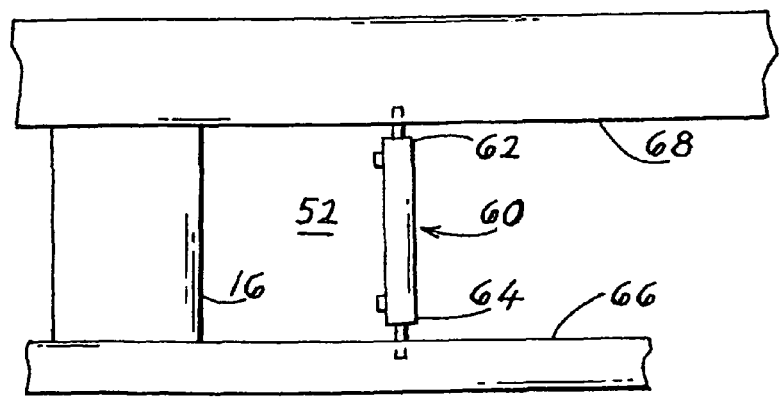
FIG. 3 is a partial sectional rear view of the truck of FIG. 1, with an air bag control of the present invention instead of the prior art control.

FIG. 3 shows a cylindrical vertical air bag control 60 of the present invention, that lies in the space 52 between primarily vertically spaced vehicle main parts 66, 68. The control has upper and lower ends 62, 64 and extends between the vehicle axle 66 and the vehicle chassis 68, or between the vehicle cab 22 (FIG. 1) and the vehicle chassis. FIG. 4 is a sectional view of the control 60 which has an inlet port 74 for connection to a pressured air supply, and an exhaust port 76 that exhausts air from the air bag to the atmosphere. The control also has an air bag port 80 that flows air into the air bag when the air bag height is below the manufacturer's preferred height A, and that flows air out of the air bag when its height is above the preferred height A. In FIGS. 4-6 pivot mounts 70 are attached to opposite ends of the control, with each mount having a shaft 72 that mounts on a vehicle suspension part such as the axle, chassis, or cab. Other mount arrangements can be used. The control includes elongated vertical members that slide vertically relative to each other and that together, extend along the vertical distance of the control. The vertical members are preferably tubes 82, 106 that telescope in one another and that enclose at least parts of valves that control the flow of air between selected ones of the three ports and at least part of the passages along which air flows.

FIG. 4 shows the control 60 when the air bag is at the preferred height with top and bottom ends 62, 64 spaced apart by distance A, so there are no air flows into or out of any of the three ports 74, 76, 80. The control includes a tube 82 with a passage 84 through which air flows and that holds a plunger spring 86. A plunger 88 has a lower end 90 that slides in the tube passage and that is upwardly biased by the spring. The plunger has an upper end 92. The tube 82 forms a first valve seat 94, which is opened and closed by the lower end 90 of the plunger, with a hole 95 extending up from the valve seat and with a seal 96 preventing air flow around the valve seat. The plunger lower end 90 and valve seat 94 form a first valve 98 that controls flow from the inlet port 74 toward the air bag port 80. The plunger upper end 92 forms a valve head 100 that controls air flow to and from the air bag port 80 and the exhaust port 76, through passages 101, 103 formed in a top member 102. A valve member 108 and valve seat 110 (FIG. 6) form a second valve 111.

FIG. 5 shows the control at a height that is a distance B less than the selected height A which may equal the manufacturer's selected height H or be slightly different. As a result, the plunger 88 has moved down and its lower end 90 lies below valve seat 94. Pressured air that is constantly applied to the inlet port 74, flows upward through the passage 84 that holds the spring, past the lower valve seat 94, and through a pressured air passage part 104 in the tube 106. The air flows past the valve head 100 and through passage 101 and the air bag port 80 to fill the air bag and increase the height A-B of the control. When the control height increases sufficiently that the plunger lower end 90 presses upward against the first valve seat 94, the flow of pressured air to the air bag stops. The control then is at approximately the desired height A.

FIG. 6 shows a situation in which the control height has increased to a height A+C. The increased height leads to the top member 102 and a valve seat 110 therein moving up and away from the valve head 100 and from a valve member 108 that both lie at the top of the plunger. Then, air can flow from the air bag port 80, through passages 101, 103 and a short passage 112 above the plunger, and out through the exhaust port 76 to the environment. Air flows out of the air bag until the control height has decreased to the height A, at which the valve closer 108 on the valve head 100 again enters the valve seat 110 and closes it. An O-ring 118 lies between the top member 102 and the shroud 106. The valve closer 108 is tapered to provide a "proportional response" so only a small flow occurs when the valve closer is only slightly below its closed position.

Applicant notes that there is a secondary spring 114 that urges the plunger downward with respect to the valve head 100. The plunger upper end can move a limited distance within a space 116 in the valve head. The space 116 has top and bottom walls. When the plunger is in the neutral position shown in FIG. 4, a small vertical movement of the top member either upward or downward will not open the valve seats 94, 110. However, if the top member 102 moves downward far enough so the top wall of the space 116 abuts the plunger then the plunger will start to move down and the valve seat 94 will open. Similarly if the top member 102 moves upward far enough that the plunger top 92 abuts the bottom wall of the space 116, then the valve seat 110 will open. The height D (FIG. 5) of the space 116 is often referred to as the "neutral zone" which is the combined upward and downward movement of the plunger that will not open any valve. A neutral zone is useful to prevent the valve from repeatedly opening and closing, which causes repeated loss of pressured air and consequent wasting of fuel to pump the air to the pressure of the pressured air source.

Thus, when the control height decreases the control opens one valve 98 to flow pressured air from port 74 into the air bag port 80. When the control height increases the control opens another valve 111 to allow the flow of air from the air bag port 80 to the exhaust port 76.

In an air bag control of the construction in FIGS. 4-6 that applicant has designed, the control had a height of 18 inches (46 cm) and a maximum horizontal width between ports 80 and 74 of 1.5 inches (3.8 cm). A control width less than half its height and preferably less than 20% of its height is desirable for light weight and to leave space for other vehicle parts.

FIGS. 7 and 8 show an air bag control 130 of another construction, which also has the advantage of being vertically elongated and not requiring a linkage. The valve includes a lower tube or cylinder 132 that has a lower part 134 that is pivotally mounted on a lower main vehicle part such as an axle. The lower cylinder forms a pressured air port 136 and an air bag port 138. An upper tube or plunger 142 lies within an upper cylinder 144 that includes a top part 146 that is pivotally mounted on one of the vehicle parts such as the chassis. The plunger 142 is downwardly biased by a main spring 150 so its lower end lies against a poppet 152 that has a vertical poppet passage 153 that extends between poppet opposite ends at 164, 200.

FIGS. 7 and 8 show the control in a neutral position wherein its height A is the preferred height. In this position, the poppet (valve member) 152 (FIG. 8) is biased upward against an upper valve seat 160 of valve 161, that lies at the bottom of the plunger, by a poppet spring 162. In the neutral position, the bottom 164 of the poppet is spaced from an upper member 170 of a valve 172 to not open a lower valve seat 174.

FIGS. 9 and 10 show the control 130 in a reduced height position A–B wherein the control height has decreased by distance B from the neutral height A. The plunger 142 has moved downward with respect to the lower cylinder 132, and the plunger 142 (FIG. 10) has pushed down the poppet 152, which has pushed down the valve assembly 172. FIG. 11 shows that the valve 172 includes a pair of members 182, 184 that have slots 186. The upper valve member has a continuous top 188, but the lower valve element has a passage 190 in its bottom 192. FIG. 10 shows that when the valve assembly is pushed down, the continuous top 188 of the upper valve member moves down away from the lower valve seat 174 of a valve 175. This allows air from the pressured air port 136 to flow through the valve assembly 172, around the lower portion 194 of the poppet, and out through the air bag port 138 to fill the air bag.

FIGS. 12 and 13 show the control 130 at an extended height A+C, due to the upper cylinder 144 and plunger 142 being raised. The upper valve seat 160 (FIG. 13) has lifted off a valve seat formed by the top 200 of the poppet 152. This allows air to flow from the air bag port 138 through holes 202 in the poppet, through a valve 201 formed by valve seat 200, and through a passageway 203 in the poppet, through passages (FIG. 12) 141, 143, a vent 145 and into a shroud 204. Air can pass through a gap 206 at the bottom of the shroud into the atmosphere.

Thus, when the control decreases in height it opens one valve 172 (FIG. 10) to allow pressured air flow into the air bag port 138. When the control increases in height, it opens another valve 201 (FIG. 13) to allow air to flow from the air bag port 138 through an exhaust port formed by gap 206 into the environment.

Figure 14:
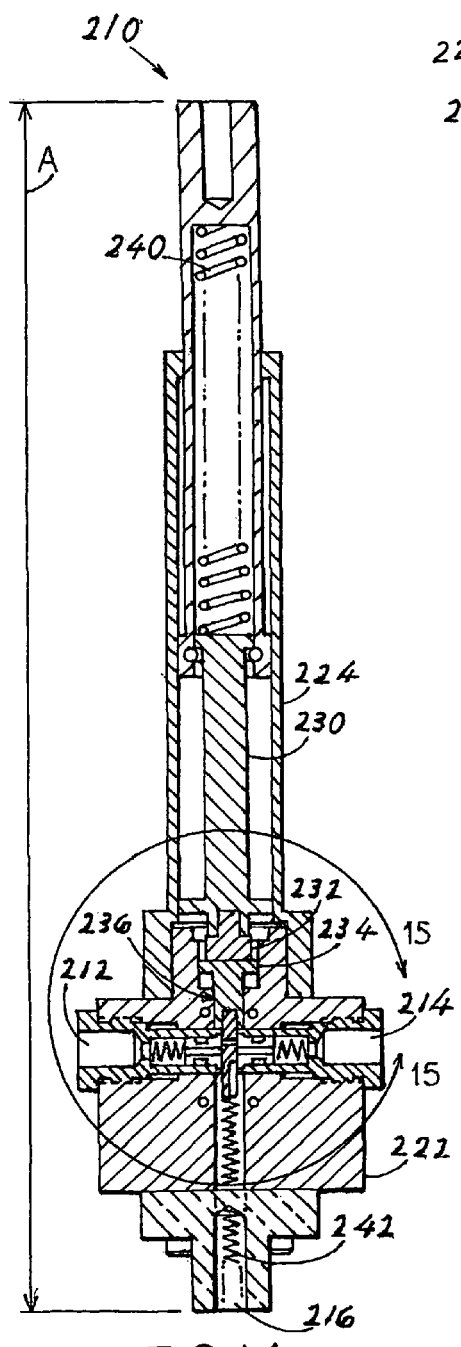
FIG. 14 is a sectional view of an air bag control of a third embodiment of the invention, with the height of the air bag being optimum.
Figure 15:
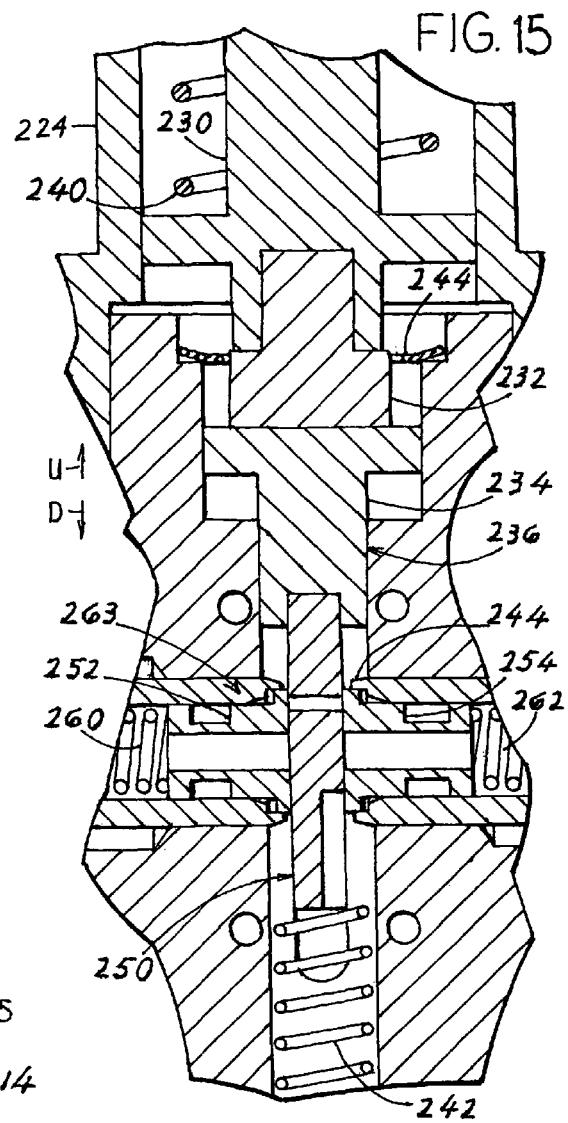
FIG. 15 is an enlarged view of area 15-15 of FIG. 14.

FIGS. 14 and 15 illustrate a control 210 of another embodiment of the invention wherein the pressured air port 212, the air bag port 214, and the exhaust port 216 are all located in a lower portion of the control. The control includes a base 222 and a tube or cylinder 224 extending up from the base. An upper member or plunger 230 (FIG. 15) has a lower end 232 that can contact a carrier 234 of a valve plate assembly 236 that can freely slide vertically in a vertical passage 238. A plunger spring 240 presses down the plunger, and a poppet spring 242 presses up the valve plate assembly. In the neutral position of the control at height A, the springs 240, 242 balance one another and the valve plate assembly 236 lies in the position shown in FIG. 15, with the plunger lower end 232 pressing against the carrier 234 and with the carrier lower end lying above a stop 244.

Figure 16:
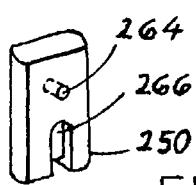
FIG. 16 is an isometric view of the valve plate of the control of FIG. 15.
Figure 17:
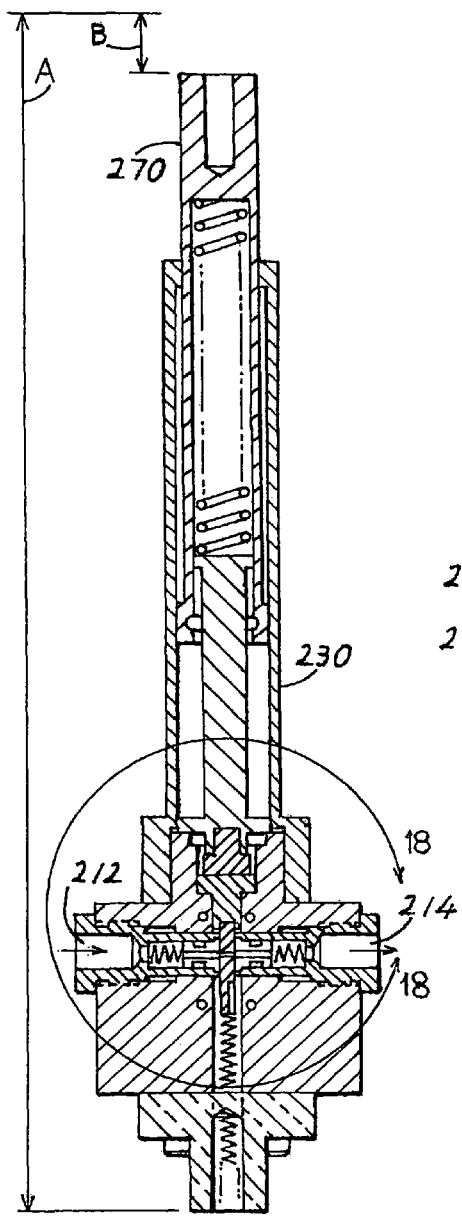
FIG. 17 is a sectional view of the control of FIG. 14 but with a reduced height.
Figure 18:
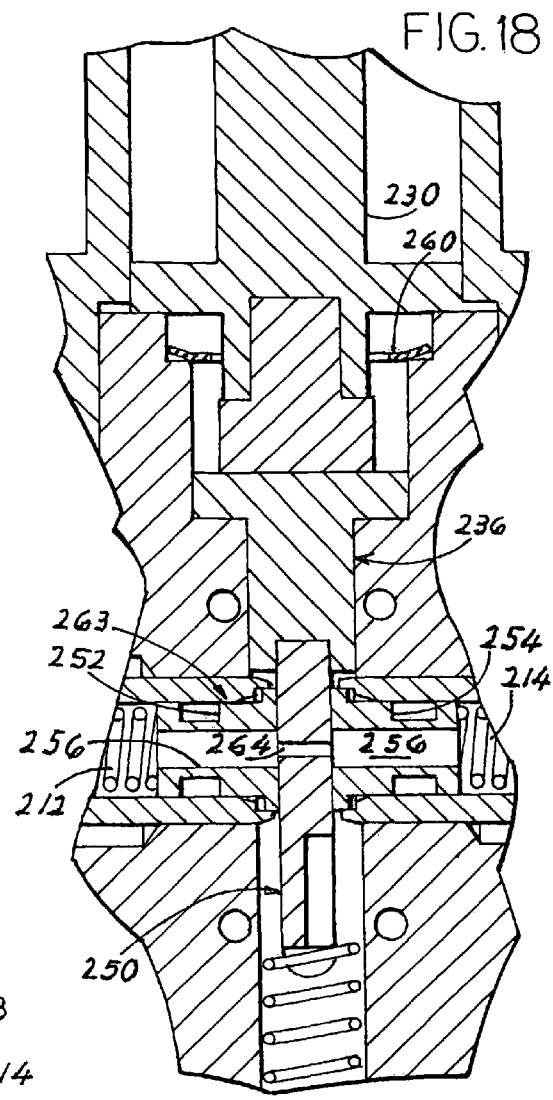
FIG. 18 is an enlarged view of area 18-18 of FIG. 17.

The valve plate assembly 236 (FIG. 15) includes a valve plate 250, that lies between plate valve members 252, 254 that are biased by valve springs 260, 262 against horizontally spaced opposite sides of the plate 250 to form a valve 263. The plate, which does not necessarily have flat opposite sides, is shown in FIG. 16 to have a through aperture 264 and to have a groove 266 with a portion that extends only partially through the plate. In the neutral position of FIGS. 14 and 15 no air flows between the ports. In FIGS. 17 and 18 an inner cylinder 270 has moved downward by distance B, so the height of the control is A-B. FIG. 18 shows that the plate 250 has been pushed down by the plunger 230 until the plate aperture 264 has become aligned with holes 256 in the valve members 252, 254, so air can flow from the pressured air port 212 to the air bag port 214. This fills the air bags and the control height returns to A.

FIGS. 19 and 20 shows the control with its ends at an increased height A+C. The plunger 230 has moved up and allowed the valve plate assembly 236 to move up to its uppermost position, or exhaust position, wherein the top of the carrier 234 abuts a stop 260. The groove 266 of the plate is now aligned with a hole in the valve member 254 to form a valve 267, and air can flow from the air bag port 214 through slot portion 268, 269 to the exhaust port 216. The control 210 of FIGS. 14-20 has the advantage that airflow is through openings of defined size so the control operate consistently. The neutral zone is the distance that the valve plate travels without allowing any air flow through its slot 266 or hole 264.

Thus, when the control decreases in height it opens one valve (formed by walls of hole 264, FIG. 18) to allow pressured air flow into the air bag port 214. When the control increases in height it opens another valve (formed by groove 266, FIG. 20) to allow air flow from the air bag port 214 to the exhaust port 216. Although the vertical air bag controls of the invention each extends primarily vertically, they each can function when turned upside-down. Therefore, a claim statement that first and second parts are respectively "upper" and "lower" parts covers the situation when the control is turned upside down.

Thus, the invention provides an air bag control that is in the shape of a small diameter post with few if any elongated parts that project from the control in the manner that a linkage projects from prior art controls. The control extends between two vehicle suspension parts, such as the axle and chassis, or chassis and driver cab. The control includes a plunger that is biased vertically by a plunger spring, with the plunger moving up and down as a top part of the control moves up and down. Downward movement of the control top opens only a first valve, or valve seat, to fill the air bags, while upward movement of the control top opens only a second valve or valve seat to exhaust air from the air bag. Although the controls are illustrated and described with the plunger being uppermost, the controls can be used in an upside-down orientation, with the plunger being lowermost.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An air bag control for mounting in a space (52) between vertically spaced main vehicle parts (66, 68) that are separated by air bags (16), to control the air pressure in at least one of the air bags so as to maintain it at a predetermined air bag height, wherein the control has a pressured air port (74, 136, 212) for receiving pressured air, an exhaust opening (76, 206, 216) for dumping pressured air into the environment, and an air bag port (80, 138, 214) that connects to the air bag, wherein said control includes first and second telescope members (82, 106, 132, 142, 224, 230) with top and bottom ends that telescope one in the other to allow the increase and decrease in control height (A) between said ends, said control comprising a plurality of valves (98, 111, 161, 175, 263, 267) in said control including a first valve (98, 172, 263) that allows the passage of air only from said pressured air port to said air bag port when the distance between said top and bottom ends decreases below a predetermined height, and a second valve (111, 161, 267) that allows the passage of air only from said air bag port to said exhaust opening when the distance between said top and bottom ends increases above said predetermined height characterized by;

said first and second valves each comprises a valve seat (94, 110,) mounted on one of said telescope members and a valve member (90, 108,) that is mounted on the other one of said valve members and that moves against and away from the corresponding valve seat to close and open the valve.

2. The control described in claim 1 wherein:

said second valve includes walls of a first of said telescope members that forms an exhaust passage (103) extending partially between said air bag port (80) and said exhaust opening (76), walls forming a second of said valve seats (110,) lying along said exhaust passage, and a second of said valve members (108,) is fixed to the second of said telescope members (106) and is moveable against said second valve seat (110) when said control height is less than said predetermined air bag height.

3. The control described in claim 2 wherein:
said exhaust passage includes an air bag passage (101) that extends from said second valve seat (110) to said air bag port (80), and said exhaust passage (103) includes a passage that extends from said valve seat to said exhaust opening (76), said second valve member being moveable against a side of said second valve seat that is sealed to said exhaust passage portion;

said telescope members form a pressured air passage (84) that extends from said pressured air port through said first valve seat (94) to said air bag passage so when said second valve is closed but said first valve is opened air from said pressured air port can flow only through said first valve seat and through said air bag passage to said air bag port.

4. An air bag control (130) for mounting in a space between primarily vertically spaced vehicle main parts that are separated by air bags, to control the air pressure in at least one of the air bags so as to maintain it at a predetermined air bag height, the control having opposite ends that are moveable closer together and further apart than a selected control height (A) that maintains said air bag at said predetermined height, wherein the control has a pressured air port (136) for receiving pressured air, an exhaust opening (206) for flowing out pressured air into the environment, and an air bag port (138) for receiving and flowing out air and that connects to the air bag comprising:

first and second elongated vertical members (142, 144) that telescope in one another and that form said control opposite ends that move closer together and further apart, and a plurality of valves (161, 172) with valve parts that are supported on said vertical members and that control the flow of air into said pressured air port, into and out of said air bag port, and out through said exhaust opening;

said valve parts include vertically spaced valve seats (174, 160), a poppet (152) with vertically spaced first and second poppet ends (200, 164) and with a poppet passage (203) extending between said poppet ends, said poppet being moveable vertically between up and down positions, a free valve member (182) that is biased in a first vertical direction (U) against one of said valve seats (174) by pressured air at said pressure air port (136) to prevent the flow of air from said pressured air port to said air bag port (138), and a plunger (142) that is vertically moveable against said first poppet end (200) to depress the poppet and cause the poppet to depress said free valve member (182) and allow the flow of pressured air from said pressured air port (136) to flow out of said air bag port (138);

a poppet spring (162) that urges said poppet in a vertical direction (U) that presses said poppet away from said free valve member (182) and against one of said valve seats (160).

5. An air bag control for mounting in a space (52) between vertically spaced main vehicle parts (66, 68) that are separated by air bags (16), to control the air pressure in at least one of the air bags so as to maintain it at a predetermined air bag height, wherein the control has a pressured air port (74, 136, 212) for receiving pressured air, an exhaust opening (76, 206, 216) for dumping pressured air into the environment, and an air bag port (80, 138, 214) that connects to the air bag, wherein said control includes first and second telescope members (82, 106, 132, 142, 224, 230) with top and bottom ends that telescope one in the other to allow the increase and decrease in control height (A) between said ends, said control comprising a plurality of valves (98, 111, 161, 175, 263, 267) in said control including a first valve (98, 172, 263) that allows the passage of air only from said pressured air port to said air bag port when the distance between said top and bottom ends decreases below a predetermined height, and a second valve (111, 161, 267) that allows the passage of air only from said air bag port to said exhaust opening when the distance between said top and bottom ends increases above said predetermined height characterized by;

said first and second valves each comprises a valve seat (94, 110, 174, 160) mounted on one of said telescope members and a valve member (90, 108, 152, 170) that is mounted on the other one of said valve members and that moves against and away from the corresponding valve seat to close and open the valve;

said first valve includes a first element (182) that is moveable against and away from a third valve seat (174) and that is forced by air pressure flowing into said pressured air port against said third valve seat, and a second element (152) that is depressable to move through said third valve seat to move said first element away from said third valve seat.

* * * * *